United States Patent [19]

Fairbanks

[11] 4,011,163
[45] Mar. 8, 1977

[54] WATER WASTE TREATMENT

[76] Inventor: Fred A. Fairbanks, 36-957 Melrose Ave., Palm Springs, Calif. 92262

[22] Filed: June 19, 1975

[21] Appl. No.: 588,244

[52] U.S. Cl. .......................... 210/208; 210/221 M; 210/256; 210/261; 261/87
[51] Int. Cl.² .......................................... B01D 21/08
[58] Field of Search ................................. 210/3–8, 210/14, 15, 20, 195, 201, 202, 207, 208, 256, 219, 220, 221 M, 260, 261; 261/87

[56] References Cited
UNITED STATES PATENTS

| | | | |
|---|---|---|---|
| 3,313,725 | 4/1967 | Koh Tsuda et al. | 210/219 |
| 3,524,810 | 8/1970 | Mackrle et al. | 210/208 |
| 3,752,313 | 8/1973 | Watin | 261/87 |
| 3,779,910 | 12/1973 | Chatfield | 210/208 |
| 3,850,810 | 11/1974 | Teodoroiu | 210/219 |

Primary Examiner—Frank A. Spear, Jr.
Assistant Examiner—Benoit Castel
Attorney, Agent, or Firm—Lyon & Lyon

[57] ABSTRACT

An apparatus for the treatment of liquid sewage, the sewage to be treated being aerated and mixed prior to being directed sequentially through primary and secondary settling circuits wherein primarily settleable solids and secondarily settleable solids are removed respectively. Such removed solids are then directed to a digester compartment, the secondarily nonsettleable sewage being discharged from the sewage treatment apparatus. In a preferred embodiment, a portion of the primarily and secondarily settleable solids are recirculated to the aerating and mixing area thus allowing for the floculation of the liquid sewage. In a further preferred embodiment an overflow weir is provided upstream of the sewage treatment apparatus outlet thereby providing a surge capacity for the sewage treatment apparatus.

The apparatus uses a hollow propeller having a plurality of holes therein on the backface thereof; the propeller is mounted on a hollow shaft. The propeller is rotated under conditions such as to promote vapor pressure conditions of the waste water at the backface of the impeller blade thereby allowing air to move through the hollow shaft, propeller and plurality of holes and aerating the sewage to be treated.

6 Claims, 4 Drawing Figures

U.S. Patent  Mar. 8, 1977  Sheet 2 of 2  4,011,163
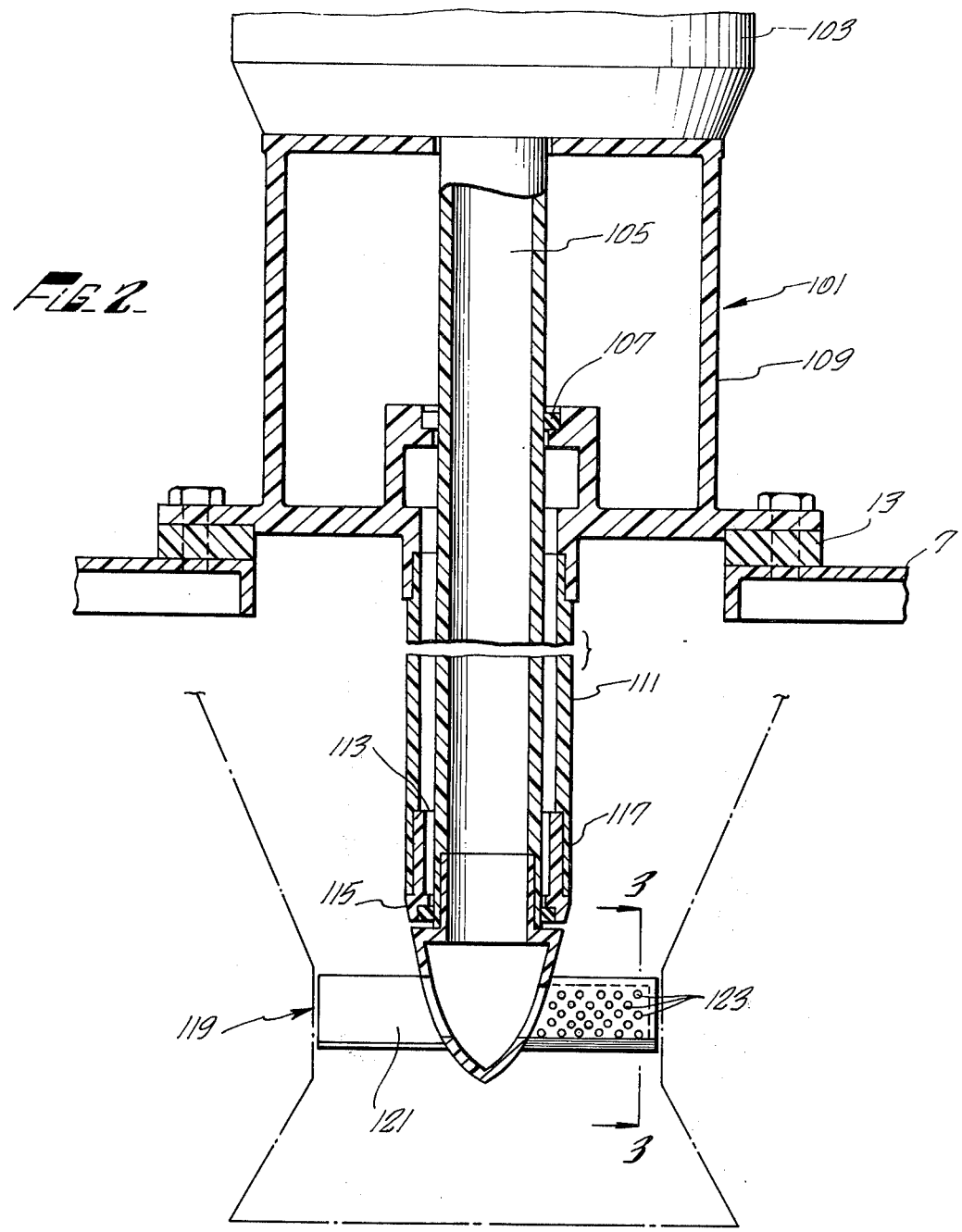
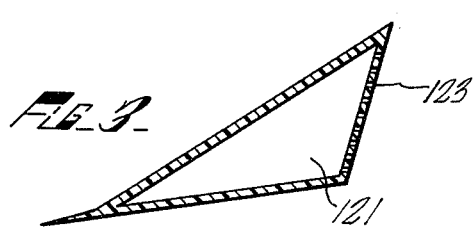
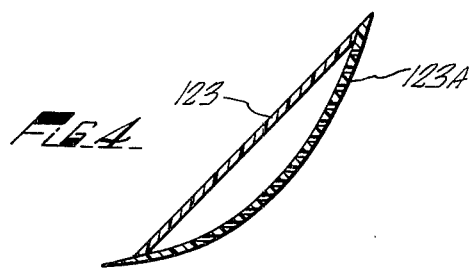

WATER WASTE TREATMENT

BACKGROUND OF THE INVENTION

1. Field of the Invention

The invention relates to an apparatus treating liquid sewage.

2. Description of Prior Art

Individual homes or small population centers which do not have conventional sewage systems are typically served by what is termed "package plant" for the treatment of sewage. Typical of one process employed in such package plants is the contact-stabilization method.

The contact-stabilization method or process is comprised of four basic steps: contact, sedimentation, stabilization and digestion. Liquid sewage to be treated is introduced into a contact chamber or tank where it is mixed and aerated with sludge solids returned to a stabilization tank. The sewage typically remains in the contact tank for from 15 to 20 minutes during which time the raw sewage and sludge under go chemical and bacteriological changes which convert most of the solids in the sewage to a suspension of liquid and activated sludge floc. Following this contact, solid particles of sewage pass into a sedimentation tank chamber where the floc settles out of the liquid suspension and is directed back to the stabilization tank where such solids remain for a period of approximately 5 hours. The stabilization tank is also aerated and mixed.

Following the 5 hour period, a portion of the floc is returned as return sludge or return solids to the contact tank and the process is repeated. The heavier sludge solids settle into a digestion tank or chamber, generally located beneath the stabilization tank where it is aerobically digested. Periodically the nondigested organic particles are removed from the digester by mechanical suction means. Liquid remaining in the sedimentation tank after the floc has settled out is discharged from the system as a purified effluent. Chlorine or other purifying agents may be mixed with the effluent prior to its discharge from the package system.

In use the contact stabilization process for package plants has permitted high organic loadings for a compact and versatile package plant of unitary construction. However, the short period of 15 to 30 minutes when combined with the substantial peak loadings inherent in such package plants in the systems of isolated individual dwellings and small population centers has resulted in an unstable and unreliable treatment system. Additionally, a relatively short 5 hour stabilization period results in a high solids accumulation rate with an attendant solids disposal problem.

In addition to the problems of inadequate contact time and possible inadequate treatment during peak loadings, such plants typically utilize compressed air for the aeration of the sewage to be treated, and the air compressors required for such systems frequently require substantial maintenance in order to keep them in operable condition.

An object of this invention is to provide an improved apparatus for the treatment of liquid sewage. Other additional objectives will be apparent upon a reading of the entire specification, drawings and claims.

SUMMARY OF THE INVENTION

In accordance with this invention an apparatus for the treatment of liquid sewage is provided whereby raw sewage to be treated is transported to an aerating and mixing area wherein the raw sewage is circulated and mixed with air. The air is provided by means of a hollow pump shaft which has a bladed propeller mounted thereon with a plurality of airholes on the backface of a propeller blade. In a preferred embodiment, the propeller is operated so as to promote a low pressure zone on the backface of the propeller blades. This low pressure zone at the propeller blade-liquid interface allows air to pass through the hollow pump shaft and outward through the air holes into the liquid to be aerated. The air passing into the interface behind the propeller blade is finely dispersed, this dispersion being assisted by the low internal pressure of the liquid at the interface. This permits intimate oxygen contact with the solids contained in the waste water. Following aeration and mixing, the sewage is directed through a primary settling circuit wherein primarily settleable solids are directed to digester compartment. That portion of the sewage which is not primarily settleable is further directed to a second settling circuit wherein secondarily settleable solids are directed to the digester compartment. The remaining liquid is discharge from the sewage treatment apparatus as purified effluent. In a preferred embodiment a portion of a solids removed in both the primary and secondary settling circuits are returned to the aerating and mixing area providing floc for flocculating the sewage to be treated. In a further preferred embodiment the continuously returned floc is broken into small particles by the propeller action. This accelerates the process and shortens the total time required for digestion due to the minutely intimate contact of oxygen with the digestibles. In a further preferred embodiment, the sewage treatment apparatus discharge is provided with a weir thereby providing a surge capacity for the sewage treatment apparatus.

BRIEF DESCRIPTION OF THE DRAWINGS

FIG. 2 is a cross sectional view of the aerating and pumping means of a sewage treatment apparatus of the present invention.

FIGS. 3 and 4 show preferred and alternate propeller blade configurations.

DESCRIPTION OF PREFERRED EMBODIMENTS

Figure 1:
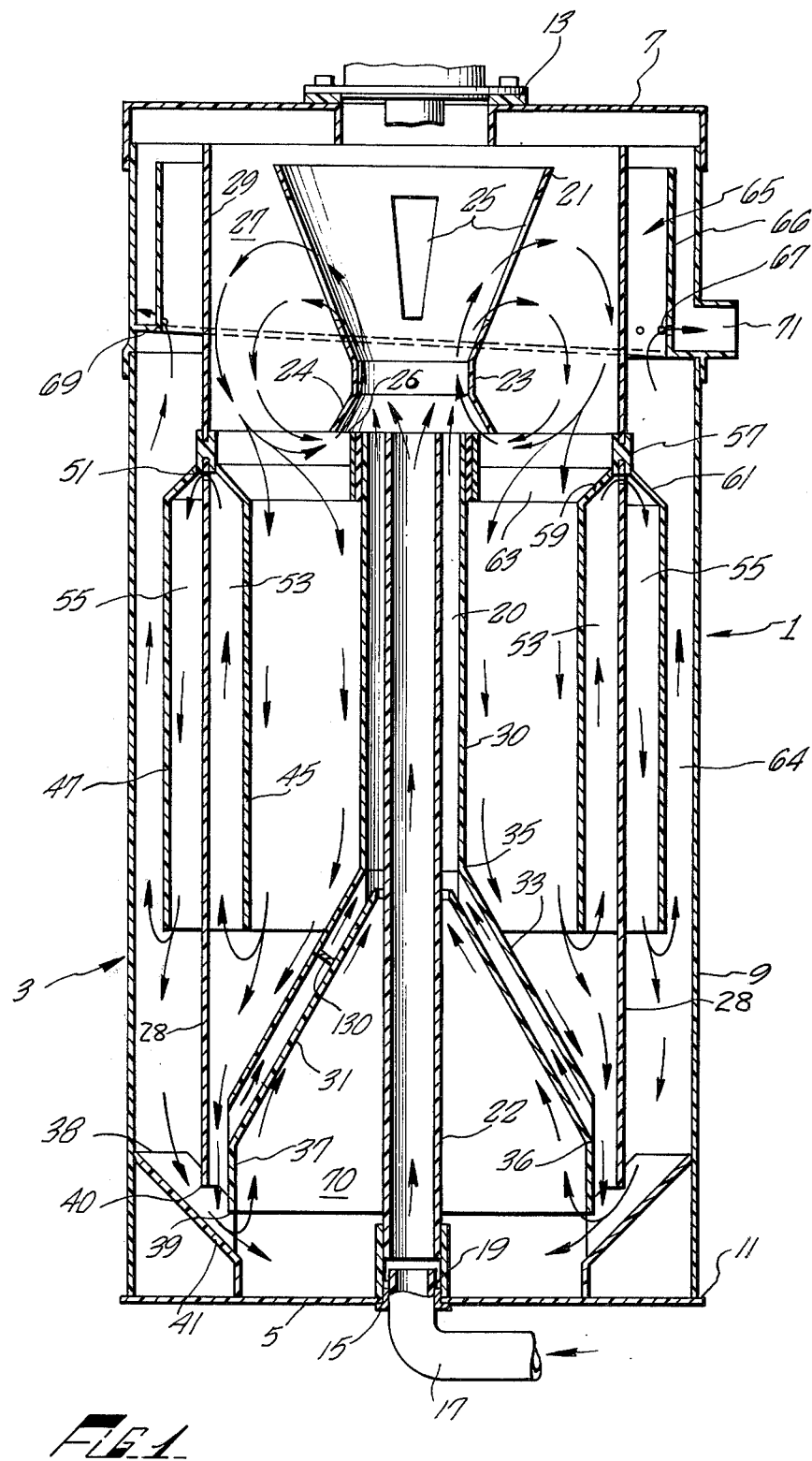
FIG. 1 is a cross sectional view of a sewage treatment apparatus of the present invention.

Referring now to FIG. 1, a sewage treatment apparatus generally referred to as 1 is depicted having an outer tank 3. The outer tank 3 have a bottom portion 5 a removeable top portion 7 and a circular wall portion 9 which is suitably joined to the outer tank bottom tank 5 at the common interface 11. The inner diameter of the outer tank top 7 may be slightly larger than the outside diameter of the outer tank wall 9 whereby the tank top 7 may be placed annularly about the upper portion of the outer tank wall 9. The tank top 7 may be further provided with a base flange 13 suitable to accommodate the aeration pump which is more fully described in FIG. 2. The outer tank bottom 5 is provided with inlet means 15 through which inlet piping means 17 may pass. Annular gasket or sealing means 19 may be provided in order to allow for the securing of the inlet piping 17 within the sewage treatment apparatus 1 so that no leakage from the tank occurs about the inlet means 15. The inlet piping 17 discharges sewage to be treated via an inner draft tube 20 into a mixing chamber 21 having a reduced cross sectional area portion 23. The mixing chamber 21 is further provided with the plurality of holes or apertures 25 through which the aerated sewage may pass. Located annularly about the mixing chamber 21 is contacting volume 27 being defined by an upper wall portion 29 which seats in annular slot at 57. In a preferred embodiment a mixing and aerating pumping means is inserted through the outer tank flange 13 which further agitates and aerates the sewage to be treated in the mixing and aeration chambers. The operation of this pumping means will be more fully described when FIG. 2 is discussed in detail.

Positioned annularly about an inner draft tube 20 is an outer draft tube 30. In a preferred embodiment, a tube cone 31 is positioned annularly about a lower portion 22 of the inner draft tube 20. Additionally, an upper cone 33 is positioned annularly about the tube cone 31 and spaced apart therefrom the upper cone 33 being joined to the outer draft tube 30 at a circular junction point 35. The tube cone 31 and upper cone 33 may be spaced apart by means of a plurality of ribs 130 which prevent vortexing within the annular passageway which they define. Both the tube cone 31 and upper cone 33 are supported by a member 37 joined to tube cone 31 at a circular junction point 36 which seats on to a plurality of notched ribs 38 at points of contact 39. A conical member 41 extends from the outer tank wall 9 to the tank bottom and deflects settleable solids into digester cavity 70. The inner tank wall 28 is similarly seated to the plurality of notched ribs 38 at points of contact 40.

The top perimeter of inner wall member 28 is provided with a plurality of equally spaced apertures 51 thereby allowing for communication between the annular space 53 formed by a first annular wall 45 and the inner wall 28 and a second annular space 55 created between the inner wall 28 and a second annular wall 47. The first and second annular walls 45 and 47 are joined at a circular point 57, junction by tapered portions 59 and 61. Joint 57 is assembled to seat on top end of inner wall 28. A support member 63 provided with a plurality of radial ribs extends from the outer draft tube 30 to the joint 57 and portion 59.

The annular volume 65 formed between the upper wall portion 29 and the weir member wall 66 provides a surge capacity for peak operating loads. The weir member 66 has a plurality of holes 67 therein and is supported from the outer tank wall 9 by means of a supportive member 69. A sewage treatment apparatus discharge 71 is provided in the outer tank wall 9. In a preferred embodiment the weir plates supportive member 69 is positioned at an incline within the waste treatment apparatus 1, the lower portion of the inclined weir supportive member 69 being positioned adjacent the outlet of the sewage treatment apparatus 1.

Referring now to FIG. 2 an aeration pump member generally referred to as 101 is shown positioned with the flange 13 of the outer tank top 7. A motor 103 may be utilized to drive the aeration pump 101. The aeration pump 101 is provided with a hollow shaft member 105 which may be adapted with a dust seal 107 contained within a motor base mounting ring 109. An enclosing tube 111 may be positioned about the hollow pump shaft 105. Additionally a bearing 113 and adapter bushing 115 and a double seal 117 may be provided 111 of the hollow pump shaft 105. At the base of the hollow pump shaft is located a propeller 119 having at least one propeller blade 121. One of the preferred embodiments of the propeller blade configuration is shown in FIG. 3 wherein a plurality of air holes 123 are provided in the backface of the propeller blade 121. An alternative configuration, also having a plurality of air holes 123A is shown in the propeller blade 121A assembly depicted in FIG. 4.

Having described the waste water treatment apparatus in detail, the method of operation of the apparatus will now be described. Sewage to be treated enters the waste water or sewage apparatus 1 by means of inlet piping 17 and inner draft tube 20. The sewage is directed into the mixing chamber 21 by the pumping means 101 and aerated thereby and passed through one or more openings 25 within the mixing chamber 21 which allows the sewage to pass into contacting volume 27. In one embodiment the entire area comprised of the mixing chamber 21 and the contacting volume 27 is denoted as being a mixing and aeration volume. Following this aeration and mixing, the sewage is directed downwardly into a primary settling circuit located between the outer draft tube 30 and the first annular wall member 45. Primarily settleable solids are deposited in a lower portion digester 70 of the sewage treatment apparatus. Solids are further allowed to settle by virtue of the additional time provided for flocculating and settling through a secondary settling circuit which was previously defined as the annular space 53 and 55. Again the secondarily settleable solids pass into the digester compartment 70 while the effluent is allowed to pass upwardly through the annular volume 64 between the outer tank wall 9 and a second annular wall 47 and annular volume 65. This effluent passes through the holes 67 provided in the weir member 66 and exits the apparatus through outlet 71.

During the peak loading conditions the effluent is detained by the weir member 66 until passing through the holes 67. Thus the annular space 65 in cooperation with the aeration-mixing chamber volume 21 and contact volume 27 provides a surge reservoir thereby preventing the untreated sewage under surge conditions from passing through the apparatus without being properly treated.

In a preferred embodiment mixed liquors and a portion of the solids settled out by means of the primary and secondary settling circuits are continually returned to the mixing chamber 23. Primary liquors are returned to the mixing chamber 23 within the annular passageway between the tube cone 31 and the upper cone 33 and the annular space between the inner draft tube 20 and the outer draft tube 30. Ribs 130 separate the cones 31 and 33 and prevent vortexing therein. A portion of the settleable solids will leave digester cavity 70 and be recirculated to the mixing chamber 23 by passing first through the annular space between upper end of cone 31 and inner draft tube 20 and second between the inner draft tube 20 and the outer draft tube 30. Such recirculation of settleable solids floc keeps the floc size small permitting very high rate oxygenation of the solids already in process and also greatly accelerates oxygen contact of new solids coming into the system and process.

Due to the slow digestion rate of fats and greases the mixing chamber 21 has the preferred embodiment of a suction bell mouth 24 in its lower extremity to form a circular annular space 26 between the same and outer draft tube 30. Through this annular space a portion of the mixed-aerated sewage in contact volume 27 is immediately and continuously recirculated to the low pressure suction area of the propeller pump. This permits a preferred degree of oxygen contact with any fats or greases that might be present.

Although preferred embodiments of this invention can be described, it will be readily apparent that alteration and modification may be resorted to without departing from the scope of the invention and such alterations and modifications are intended to be included within the scope of the appended claims. For example, the apparatus may be utilized for the settling of a multiplicity of solid-liquid solutions wherein it is desired to separate the solids. Additionally it is understood that chemical additives might be added through the hollow pump shaft in addition to or in place of the aeration provided by the propellered pump necessary for the bacteriological process which is utilized to convert sewage solids through a suspension of liquid and activated sludge floc.

What is claimed is:

1. A sewage treatment apparatus comprising:
an outer tank defining an enclosure therewithin;
a mixing chamber positioned inside said outer tank;
a draft tube adapted for transporting sewage to be treated to said mixing chamber and an outer draft tube positioned annularly about said draft tube,
an inner tank positioned annularly about said outer draft tube, said inner tank being located below, and open to, and in communication with said mixing chamber and defining a primary settling circuit between said draft tube and said inner tank;
first and second annular walls forming first and second annular passageways, said first annular wall being positioned between said inner tank and said outer draft tube, said second annular wall being positioned between said inner tank and said outer tank, said inner tank having an aperture therein, whereby said first and second annular passageways are open to and in communication with each other, and thereby defining a secondary settling circuit;
said primary settling circuit being defined by said annular first wall of said inner tank and said outer draft tube, said outer draft tube being open to and connecting said primary and secondary circuits to said mixing chamber, whereby a portion of sewage solids removed in said primary and secondary circuits may be returned to said mixing chamber;
a pumping means positioned within said mixing chamber and adapted to introduce air into said sewage to be treated, said pumping means being further defined as comprising:
a shaft, having a passageway therein;
a hollow propeller section mounted on said shaft, said propeller section having a cavity therein, said propeller cavity being in communication with said shaft passageway, said propeller section being adapted to be submerged and rotated in a first fluid, said propeller section further comprising at least one blade having a forward and rearward face, the forward face being disposed at an angle relative to the centerline of said shaft such that the lower portion of said forward face leads the upper portion of said forward face as said shaft and propeller are rotated, the rearward face of said propeller blades being provided with a plurality of holes in communication with said propeller cavity;
a digester compartment in communication with said primary and secondary settling circuits; and
a sewage treatment outlet positioned in said outer tank and in communication with said secondary settling circuit.

2. The apparatus claimed in claim 1 wherein said mixing chamber is further defined as being surrounded by a contacting chamber which is in communication with said mixing chamber inlet and a plurality of apertures in said mixing chamber outlet.

3. The apparatus claimed in claim 1 wherein said outer tank is provided with a removable tank top.

4. The apparatus claimed in claim 1 wherein an annular weir is positioned upon a support member in the annular space between said outer tank and said inner tank, and thus in communication with said secondary settling circuit, the weir discharge being adjacent said sewage treatment outlet, said weir having a plurality of small holes in the weir base, whereby treated sewage under normal conditions, having passed through said mixing chamber and said first and second settling circuits, exits said sewage treated apparatus by passing through said inner holes and through said outlet, under peak load conditions, the volume between the weir and the inner tank providing a surge capacity.

5. The apparatus claimed in claim 4 wherein said annular weir support member is inclined, the lowest portion of said inclined weir support member being adjacent said sewage treatment apparatus outlet.

6. The apparatus claimed in claim 1 wherein said shaft passageway is open to the atmosphere whereby a second fluid air may be drawn into said propeller cavity and exit said propeller holes.

* * * * *